W. R. WHITNEY.
MOLDED METALLIC ARTICLE AND METHOD OF MAKING THE SAME.
APPLICATION FILED OCT. 12, 1910.
1,121,960.
Patented Dec. 22, 1914.
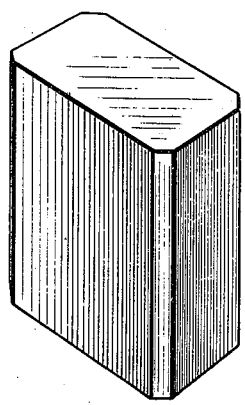
Contains a metal sulphide.
Witnesses:
Adolf Grimm
J. Ellis Glen.
Inventor:
Willis R. Whitney,
by Albert G. Davis
His Attorney.

UNITED STATES PATENT OFFICE.

WILLIS R. WHITNEY, OF SCHENECTADY, NEW YORK, ASSIGNOR TO GENERAL ELECTRIC COMPANY, A CORPORATION OF NEW YORK.

MOLDED METALLIC ARTICLE AND METHOD OF MAKING THE SAME.

1,121,960. Specification of Letters Patent. Patented Dec. 22, 1914.

Application filed October 12, 1910. Serial No. 586,684.

*To all whom it may concern:*

Be it known that I, WILLIS R. WHITNEY, a citizen of the United States, residing at Schenectady, county of Schenectady, State of New York, have invented certain new and useful Improvements in Molded Metallic Articles and the Method of Making the Same, of which the following is a specification.

My invention relates to the manufacture of bearing materials such as brushes for dynamo electric machines, dash-pots, bearings for shafts and the like, and it involves the use of a sulfid of a metal of the chromium group, particularly the sulfid of molybdenum, the sulfid being associated as a lubricant with the material constituting the main body of the bearing, for example, soft metal such as copper or tin.

The accompanying drawing shows a brush for a dynamo electric machine as illustrating my invention.

While I do not desire to be limited to any particular manner of introducing the sulfid lubricating material, I have found it to be advantageous to incorporate the same intimately with the metal, carbonaceous material or other substances constituting the brush or bearing.

The following specific examples will serve to illustrate my invention.

For the manufacture of a metallic brush, or bearing, a mixture consisting for example of 1000 parts of black copper oxid, $Cu_2O$, 127 parts of tin oxid, $SnO_2$, 80 parts of carbon or graphite and in the neighborhood of 65 parts of molybdenum sulfid $MoS_2$ is finely powdered, for example, by being pulverized in a ball mill. This mixture is placed in a suitable retort and heated for about eight hours to a temperature of 650 to 700° C. At the end of this time a large part of the metallic oxids have been reduced by the graphite to the metallic state, but the mixture should still contain some unreduced oxid varying perhaps from .5 to 2.5%. Upon cooling the mixture is put through a 100 mesh sieve and is then compressed into desired form. The compressed articles are then packed in charcoal so as to exclude air and are again heated to a temperature of about 650 to 700° C., thereby completing the reduction of the copper and the tin by the carbon. Alloyage takes place between the copper and tin and thereby causes the article to be consolidated. The proportion of sulfid to the other materials will vary, of course, with the use for which these materials are intended. In the specific example just given the proportion of molybdenum and sulfur as elementary constituents in the finished product will be in the neighborhood of 6%.

It is not necessary, of course, that the molybdenum sulfid shall be incorporated with the metallic material while the latter is in the oxid form, but this particular example is merely given as one specific way of making the bearing material. The sulfid can be mixed with the finely divided metal or metals and these can later be consolidated by any desired process, for example, by allovage as is the case in the example given.

The sulfid of molybdenum, or other metal of the chromium group, may likewise be added with advantage to carbon brushes. For example, the finely divided sulfid of molybdenum is intimately mixed with powdered coke, lamp black or other carbonaceous material with a suitable binder such as tar or pitch. These materials may be mixed with the binder by kneading or working them while hot, or better still, by grinding them in a liquid solvent for the binder, such as benzol. When the latter method is used the benzol is evaporated after the binder has been thoroughly distributed, and the caked mass is pulverized. In either case the mixture is molded into desired form, as by pressing or squirting. The formed articles are finally fired to carbonize and set the binder, leaving the sulfid uniformly distributed throughout the mass.

While I have indicated the sulfid of molybdenum as being particularly suited for the purpose of my invention, other sulfids of other metals of the chromium group such as sulfid of tungsten likewise can be used.

What I claim as new and desire to secure by Letters Patent of the United States is:

1. As an article of manufacture, a brush for dynamo electric machines consisting of metallic material and a sulfid of molybdenum.

2. As an article of manufacture, a brush for dynamo electric machines comprising copper, metallic material alloyable therewith and molybdenum sulfid.

3. An article of manufacture comprising a shaped homogeneous body consisting largely of soft metal and a uniformly distributed lubricating material containing sulfur and molybdenum.

4. An article of manufacture comprising a shaped current collector containing copper, a soft metal readily alloyable with copper, molybdenum and sulfur as elementary constituents.

5. An article of manufacture comprising a molded body consisting largely of copper and a lubricating material uniformly distributed therethrough containing sulfur and molybdenum as constituents.

6. The process which consists in mixing metallic oxid, carbon and molybdenum sulfid, heating to reduce most of said oxid, molding the mixture and heating at a temperature of about 650° to 700° C. until consolidation has taken place.

In witness whereof, I have hereunto set my hand this 11th day of October, 1910.

WILLIS R. WHITNEY.

Witnesses:
BENJAMIN B. HULL,
HELEN ORFORD.